(12) United States Patent
Michels et al.

(10) Patent No.: US 11,820,349 B2
(45) Date of Patent: Nov. 21, 2023

(54) PNEUMATIC BRAKE PEDAL MODULE

(71) Applicant: ZF Active Safety GmbH, Koblenz (DE)

(72) Inventors: Erwin Michels, Kail (DE); Peter Polke, Hanroth (DE)

(73) Assignee: ZF Active Safety GmbH, Koblenz (DE)

( * ) Notice: Subject to any disclaimer, the term of this patent is extended or adjusted under 35 U.S.C. 154(b) by 0 days.

(21) Appl. No.: 17/868,180

(22) Filed: Jul. 19, 2022

(65) Prior Publication Data

US 2023/0031027 A1 Feb. 2, 2023

(30) Foreign Application Priority Data

Jul. 27, 2021 (DE) .......................... 102021119438.5

(51) Int. Cl.
*B60T 7/04* (2006.01)

(52) U.S. Cl.
CPC ........... *B60T 7/042* (2013.01); *B60T 2270/82* (2013.01)

(58) Field of Classification Search
CPC ........ B60T 7/042; B60T 2270/82; B60T 7/06; B60T 8/409; G05G 1/38; G05G 1/44; G05G 5/03; G05G 1/30
See application file for complete search history.

(56) References Cited

U.S. PATENT DOCUMENTS

| | | | | |
|---|---|---|---|---|
| 6,367,886 | B1* | 4/2002 | Shaw | B60T 8/4086 303/50 |
| 7,425,042 | B2* | 9/2008 | Fujiwara | B60T 7/042 303/114.1 |
| 7,954,908 | B2* | 6/2011 | Giering | B60T 7/042 60/553 |
| 8,985,714 | B2* | 3/2015 | von Hayn | B60T 7/06 74/513 |
| 10,571,949 | B2* | 2/2020 | Isono | B60T 11/18 |
| 2018/0093648 | A1 | 4/2018 | Pennala et al. | |

FOREIGN PATENT DOCUMENTS

| | | | |
|---|---|---|---|
| DE | 19755481 A1 | 6/1999 | |
| DE | 29921027 U1 | 6/2001 | |
| DE | 102006030846 A1 | 1/2008 | |
| JP | 2005075162 A | 3/2005 | |
| KR | 20100032131 A * | 3/2010 | ............... G05G 1/30 |
| KR | 20100032131 A | 3/2010 | |

OTHER PUBLICATIONS

Machine translation of KR 20100032131A obtained from fit database. (Year: 2010).*

* cited by examiner

*Primary Examiner* — Thomas C Diaz
(74) *Attorney, Agent, or Firm* — Kristin L. Murphy

(57) ABSTRACT

A pneumatic brake pedal module for a "brake-by-wire" brake system of a vehicle is disclosed. The brake pedal module has a pivotably mounted brake pedal and having a damping unit, which is mechanically coupled to the brake pedal to generate a resistance when the brake pedal is actuated, such that the damping unit is subjected to tension when the brake pedal is actuated.

18 Claims, 4 Drawing Sheets

PNEUMATIC BRAKE PEDAL MODULE

CROSS-REFERENCE TO RELATED APPLICATION

This application claims priority to German Patent Application No. 5102021119438.5, filed Jul. 27, 2021, the disclosure of which is incorporated herein by reference in its entirety.

TECHNICAL FIELD

The disclosure relates to a pneumatic brake pedal module for a "brake-by-wire" brake system of a vehicle.

BACKGROUND

In the case of "brake-by-wire" brake systems, a braking intention of a driver is detected electronically, and the brakes of the vehicle are actuated by one or more purely electric actuators. For this purpose, provision can be made for each of the brakes of the individual wheels to be assigned an electric-motor actuator, as known, for example, in the case of an "EMB" (electric-motor brake). However, provision can also be made for an electrohydraulic actuator to be activated centrally in order to actuate the brakes hydraulically in a conventional manner, as known, for example, in an "IBS" (integrated brake system). Furthermore, a "brake-by-wire" brake system can be embodied as a hybrid system in that the brakes of one vehicle axle, for example those of the front wheels, are assigned to an "IBS" and the brakes of another vehicle axle, for example those of the rear wheels, are each embodied as an "EMB".

Since in "brake-by-wire" brake systems there is generally no mechanical connection between a brake pedal and the brakes, a reaction behaviour of the brake pedal is simulated, e.g. hydraulically, for the driver. More precisely, a greater resistance acts with increasing travel when the brake pedal is actuated.

Although such hydraulic systems allow good simulation of a reaction behaviour of the brake pedal, they are complicated in terms of integration into a vehicle environment.

SUMMARY

What is needed is a brake pedal module which can be integrated particularly easily into a vehicle installation space and at the same time can simulate a reaction behaviour of the brake pedal in the best possible manner.

According to the disclosure, a pneumatic brake pedal module for a "brake-by-wire" brake system of a vehicle is provided, having a pivotably mounted brake pedal and having a damping unit. The damping unit is mechanically coupled to the brake pedal in order to generate a resistance when the brake pedal is actuated, such that the damping unit is subjected to tension when the brake pedal is actuated.

The use of a pneumatic brake pedal module has the advantage that no hydraulic fluid is necessary for the operation of the module, as a result of which the brake pedal module can be of simpler design. In one exemplary arrangement, sealing the system is less complicated.

Since the damping unit is subjected to tension when the brake pedal is actuated, the damping unit can be positioned in a more flexible way relative to the brake pedal than a damping unit which is subjected to compression. It is thereby possible to adapt a brake pedal module particularly well to the existing installation space conditions in a vehicle.

The damping unit serves to simulate a reaction behaviour of the brake pedal for the driver.

In one exemplary arrangement, the brake pedal is formed by a strut, which, at a first end, has an actuating surface that can be actuated by a driver in order to signal a braking intention, and which is coupled to the damping unit in an end section opposite the first end. The brake pedal is mounted pivotably between the first end and the end section on a mounting which is fixed with respect to the vehicle. By virtue of the fact that the articulated mounting of the brake pedal is arranged between the actuating surface and the damping unit, a pressure movement on the actuating surface of the brake pedal can be converted in a simple manner into a pulling movement on the damping unit. Here, the strut acts like a rocker.

According to one exemplary arrangement, the damping unit comprises a housing and a piston mounted movably in the housing, wherein a piston rod extends from an end of the piston and the piston is coupled via the piston rod to the brake pedal. Consequently, the piston is moved in the housing when the brake pedal is actuated.

The piston rod can be coupled to the brake pedal either directly or indirectly via an intermediate piece.

The damping unit comprises a return spring, which pushes the piston into an unactuated initial position. The piston is in the unactuated initial position when the brake pedal is not actuated. The return spring produces a resistance which contributes to producing the reaction behaviour of the brake pedal. However, the return spring serves primarily to move the brake pedal back into its unactuated position.

In one exemplary arrangement, the return spring is of progressive design. A spring of this kind has a non-linear characteristic curve. To be more precise, a progressive spring is relatively soft when subjected to little force and becomes harder when subjected to increasing load.

The piston has, for example, a circular surface on one end and an annular surface on an opposite end, wherein the annular surface delimits a pressure chamber in the housing, which pressure chamber is compressed by the movement of the piston when the brake pedal is actuated, and the circular surface delimits a vacuum chamber in the housing, the volume of which vacuum chamber is enlarged when the brake pedal is actuated. Both the pressure chamber and the vacuum chamber contribute to the damping effect of the damping assembly. This is because, as the compression of the pressure chamber increases, a pressure in the pressure chamber rises, as a result of which a resistance rises as the brake pedal is actuated. At the same time, a vacuum in the vacuum chamber rises when the volume of the vacuum chamber is enlarged as the piston is actuated, as a result of which the resistance likewise rises as the brake pedal is actuated. This is because, as the volume of the vacuum chamber increases, a greater expenditure of force is required to expand the vacuum chamber further. The pressure chamber and the vacuum chamber consequently form complementary working chambers.

In order to allow the piston to move over a sufficiently large axial distance and to allow a corresponding pedal travel, there is a flow connection between the pressure chamber and the vacuum chamber. Without this flow connection, an excess pressure or a vacuum in the damping unit would rise so sharply, even after a relatively small axial movement of the piston, that a further movement would only be possible with a very high expenditure of force.

According to one exemplary arrangement, a restrictor is integrated into the piston, which restricts an air flow from the pressure chamber into the vacuum chamber more strongly when the brake pedal is actuated than when the brake pedal is reset. This has the advantage that strong damping takes place when the brake pedal is actuated, while at the same time rapid resetting of the brake pedal is possible. Thus, a hysteresis is imposed on the movement of the brake pedal.

In one exemplary arrangement, the flow connection between the vacuum chamber and the pressure chamber is integrated into the restrictor.

According to one exemplary arrangement, the piston is non-rotatably mounted. The non-rotatable mounting is achieved, for example, by virtue of the fact that the piston and the housing have a non-circular cross section. The non-rotatable mounting of the piston permits particularly reliable detection of the movement path of the piston.

In one exemplary arrangement, the damping unit is pneumatically self-contained. For example, the housing is pneumatically self-contained. A particular advantage here is that there are no fluid connections on the damping unit or no fluid lines need to be connected to the damping unit. Thus, the brake pedal module can be manufactured as a separate unit and positioned in an installation space environment independently of other components or fluid lines.

Moreover, in one exemplary arrangement, the damping unit can be compact as a result.

According to one exemplary arrangement, the brake pedal module comprises a sensor unit for detecting a braking intention of a driver. For example, a braking intention is detected electronically. Based on the detected braking intention, a signal can be forwarded to the actuators assigned to the wheels, which then generate a braking effect.

The brake pedal module according to the disclosure is suitable for use in a "brake-by-wire" brake system, which is equipped with "EMB" brakes and/or is designed as an "IBS" system.

BRIEF DESCRIPTION OF DRAWINGS

Further advantages and features of the disclosure will become apparent from the following description and from the accompanying drawings, to which reference is made. In the drawings.

DETAILED DESCRIPTION

Figure 1:
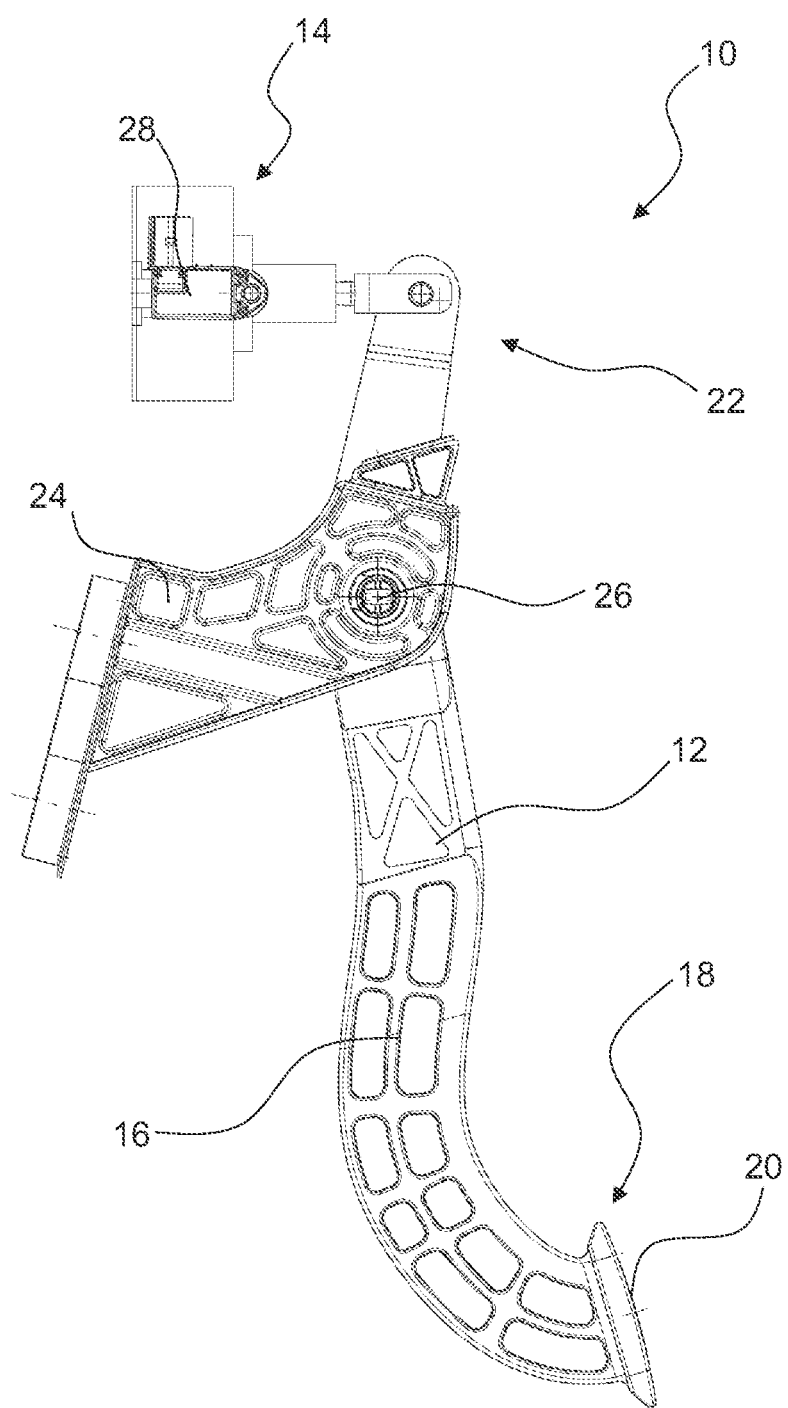
FIG. 1 shows a brake pedal module according to the disclosure in a side view.
Figure 2:
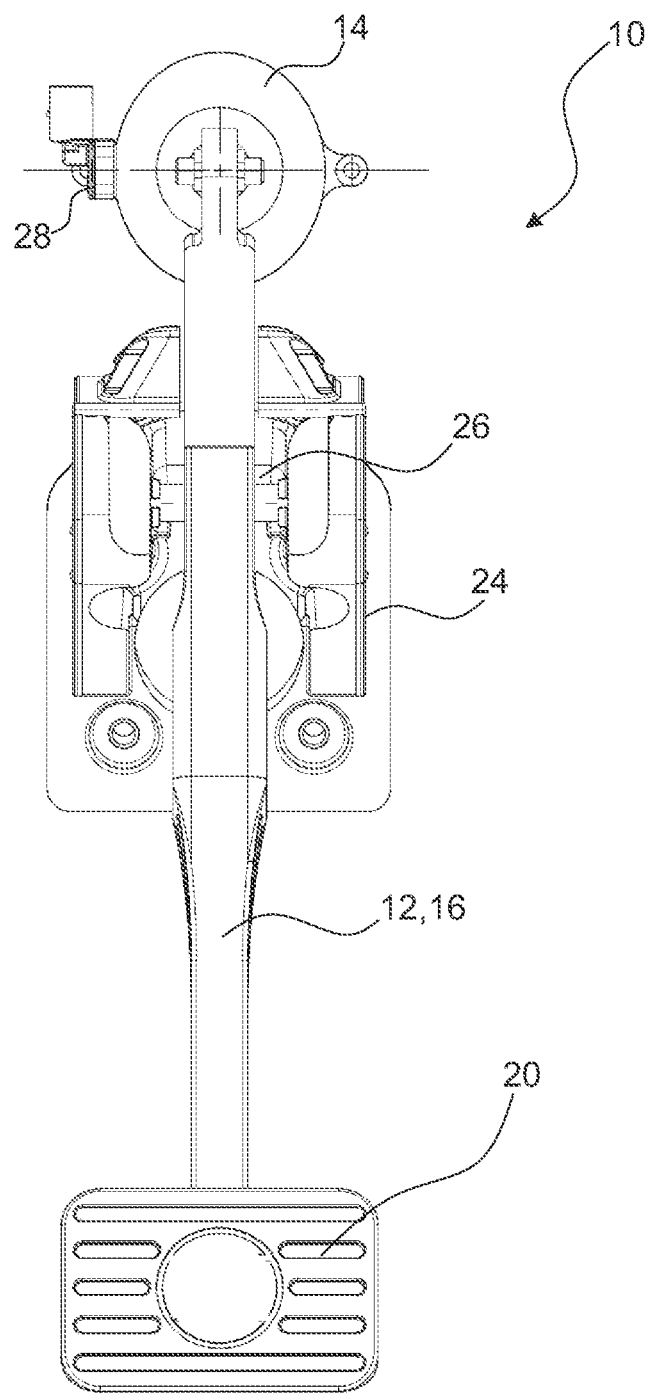
FIG. 2 shows the brake pedal module from FIG. 1 in a plan view.

FIGS. 1 and 2 show a pneumatic brake pedal module 10 for a "brake-by-wire" brake system of a vehicle in a side view and a plan view.

In particular, the brake pedal module 10 serves to electronically detect a braking intention of a driver.

The brake pedal module 10 comprises a pivotably mounted brake pedal 12 and a damping unit 14, which is mechanically coupled to the brake pedal 12.

The damping unit 14 is used to generate a resistance when the brake pedal 12 is actuated.

The brake pedal 12 is formed by a strut 16.

At a first end 18, the strut 16 has an actuating surface 20, which can be actuated by a driver to signal a braking intention. In other words, a driver can exert a pressure on the actuating surface 20 with the foot to signal a braking intention.

The damping unit 14 is coupled to the strut 16 at an end section 22 opposite the first end.

Between the ends of the strut 16, the brake pedal 12 is pivotably mounted on a mounting 24 fixed with respect to the vehicle.

In the exemplary arrangement, the pivotable mounting is implemented by a pivot joint 26.

In the exemplary arrangement, the mounting 24 fixed with respect to the vehicle is a further strut, which can be screwed to a body part.

The strut 16 and the mounting 24 are plastic injection mouldings, for example.

The brake pedal module 10 furthermore comprises a sensor unit 28 for detecting a braking intention of a driver.

It can be seen from FIG. 1 that the damping unit 14 is subjected to tension when the brake pedal 12 is actuated. This allows particularly flexible positioning of the damping unit 14, thereby enabling the brake pedal module 10 to be integrated particularly well into an installation space environment.

For example, a distance of the damping unit 14 from the pivot joint 26 can be selected relatively freely.

Furthermore, in a further exemplary arrangement, the strut 16, which is of relatively straight design in the exemplary arrangement shown, can be angled, for example in the pivot joint 26 or between the pivot joint 26 and the damping unit 14. As a result, the position of the damping unit 14 can also be selected in a flexible way in the longitudinal direction of the vehicle.

Compared with a damping unit which is subjected to compression, the damping unit 14 subjected to tension can thus be arranged in a particularly flexible manner in an installation space environment.

The damping unit 14 is explained in more detail with reference to FIGS. 3 and 4, which each show a section through the damping unit 14.

The damping unit 14 comprises a housing 30, in which a piston 32 is accommodated and movably mounted.

A piston rod 36 extends from an end 34 of the piston 32.

More precisely, the piston 32 has an annular surface 38 on the end 34 and a circular surface 42 on an opposite end 40.

The annular surface 38 delimits a pressure chamber 44 in the housing 30, which space is compressed by the movement of the piston 32 when the brake pedal 12 is actuated. Consequently, the piston rod 36 extends through the pressure chamber 44.

The circular surface 42 delimits a vacuum chamber 46 in the housing 30, the volume of which space is increased when the brake pedal 12 is actuated.

In the exemplary arrangement, the volume of the vacuum chamber 46 is initially zero since the circular surface 42 bears against a housing wall of the housing 30.

Via the piston rod 36, the piston 32 is coupled to the brake pedal 12, an intermediate piece 48 being arranged between the piston rod 36 and the brake pedal 12 in the exemplary arrangement.

The connection between the piston rod 36 and the intermediate piece 48 and between the intermediate piece 48 and the brake pedal 12 is in each case implemented by a pin 50, 52.

Figure 3:
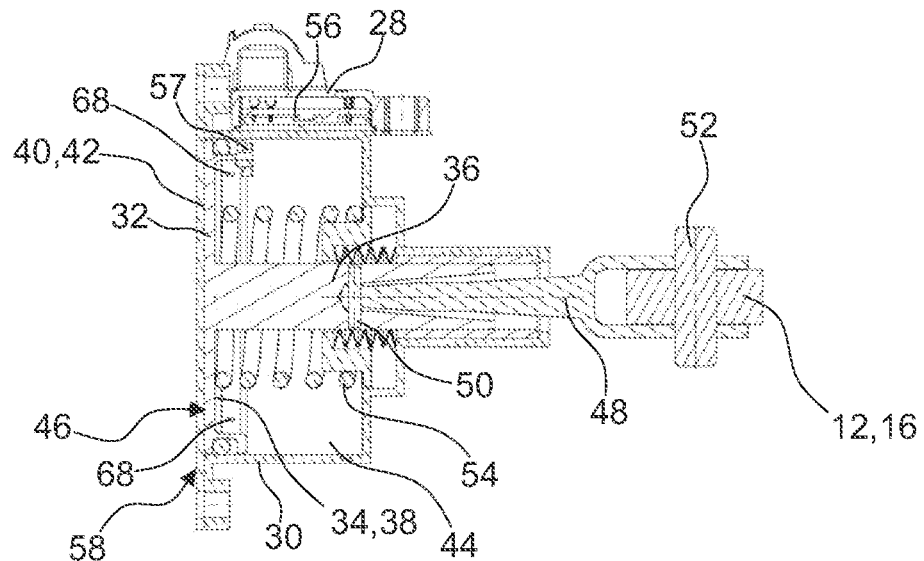
FIG. 3 shows a sectional illustration of a damping unit of the brake pedal module according to the disclosure.
Figure 4:
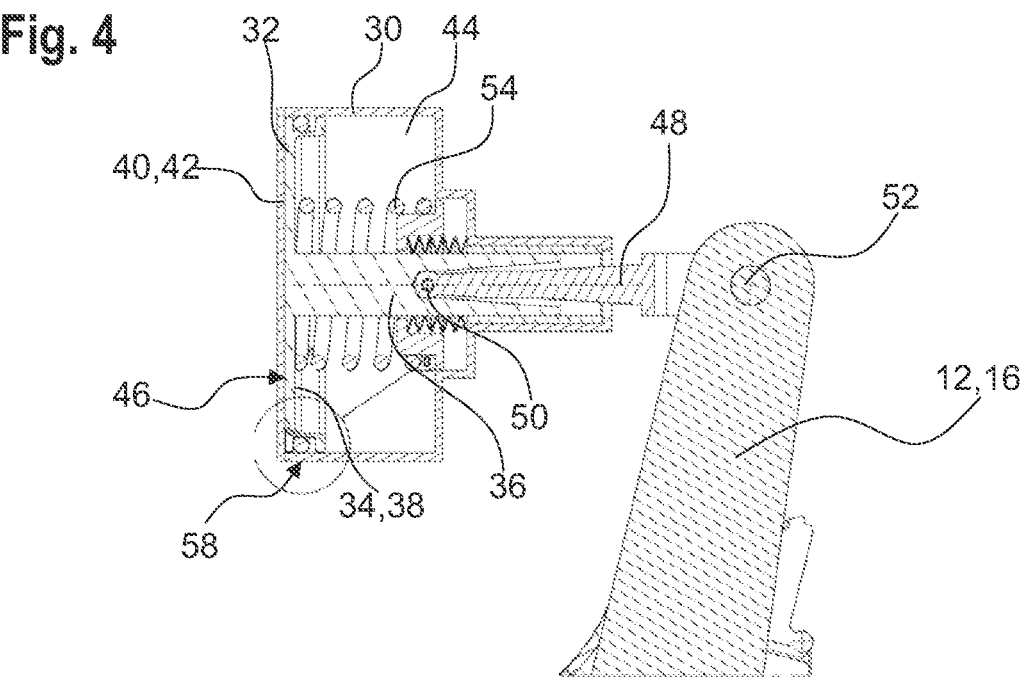
FIG. 4 shows a further sectional illustration of the damping unit of the brake pedal module according to the disclosure.

The damping unit 14 further comprises a return spring 54, which pushes the piston 32 into the unactuated initial position shown in FIG. 3. In this state, the brake pedal 12 is not actuated by a user.

FIG. 3 also shows the structure of the sensor unit 28.

In the exemplary arrangement, the sensor unit 28 comprises at least one Hall element 56, which is arranged outside the housing 30, and a magnet 57, which is secured on the piston 32.

In order to ensure that the sensor unit 28 functions reliably and a movement of the piston 32 is reliably detected, the piston 32 is mounted non-rotatably in the housing 30.

The non-rotatable mounting of the piston 32 can be achieved by a non-circular cross section of the piston 32 and a correspondingly non-circular cross section of the housing 30 (see FIG. 2).

There is a flow connection between the pressure chamber 44 and the vacuum chamber 46.

The flow connection is implemented by a restrictor 58, which is integrated into the piston 32.

The restrictor 58 is designed in such a way that it restricts an air flow from the pressure chamber 44 into the vacuum chamber 46 when the brake pedal 12 is actuated more than an air flow from the vacuum chamber 46 into the pressure chamber 44 when the brake pedal 12 is reset.

Figure 5:
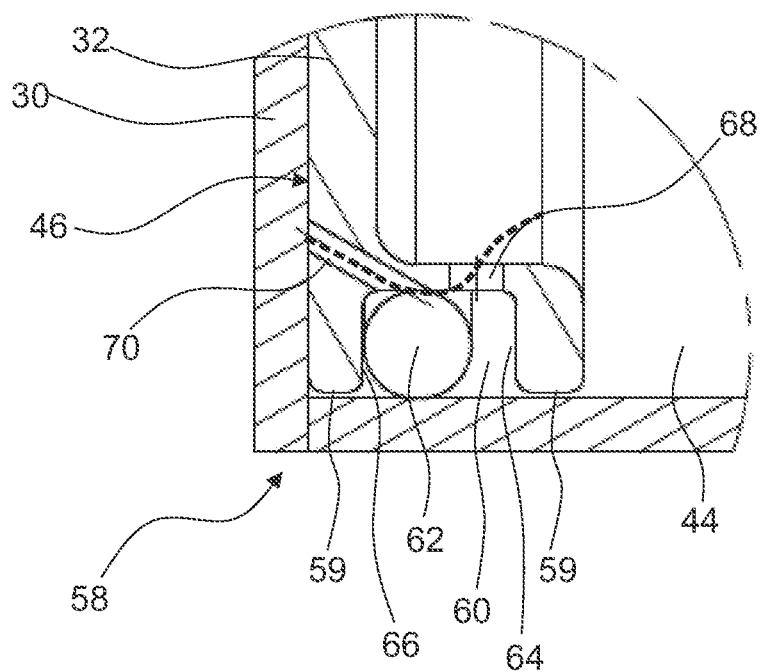
FIG. 5 shows a detail view in the region of a restrictor of the damping unit.
Figure 6:
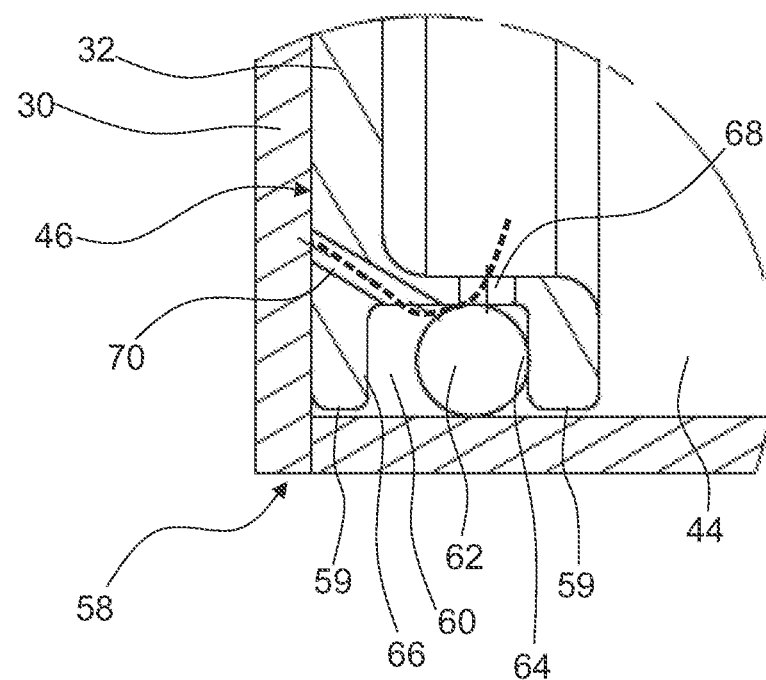
FIG. 6 shows the restrictor of the damping unit from FIG. 5 in a further state.

The structure and mode of operation of the restrictor 58 is explained with reference to FIGS. 5 and 6, which each show a detail view in the region of a running surface 59 of the piston 32, FIG. 5 illustrating a state when the brake pedal 12 is actuated and FIG. 6 illustrating a state when the brake pedal 12 is being reset.

On its running surface 59, the piston 32 has an encircling annular space 60, which is formed, for example, by an encircling groove.

A ring seal 62 is accommodated in an axially movable manner in the annular space 60.

The ring seal 62 is located in at least one flow path between the pressure chamber 44 and the vacuum chamber 46 and forms the restrictor 58 in the at least one flow path.

The annular space 60 is bounded by two opposite, axial boundary surfaces 64, 66.

Starting from the annular space 60, near the boundary surface 64 which is closer to the pressure chamber 44, a plurality of first openings 68 in the piston 32 leads to the pressure chamber 44 (see also FIG. 3). For example, six first openings 68 are provided, which are distributed uniformly in the circumferential direction of the piston 32.

Furthermore, starting from the annular space 60, near the boundary surface 66 which is further away from the pressure chamber 44, a plurality of second openings 70 in the piston 32 leads to the vacuum chamber 46. For example, six second openings 70 are provided, which are distributed uniformly in the circumferential direction of the piston 32.

In the exemplary arrangement, the first openings 68 have, in total, a larger flow cross section than the second openings 70 in total. This can also be achieved if, when considered individually, the first openings 68 have a flow cross section which is smaller than or the same as that of the second openings 70, but are present in a larger number.

The restrictor 58 frees different flow cross sections in the at least one flow path depending on the axial direction of movement, and damps the movement of the piston 32 with differing degrees of strength depending on a direction of movement of the piston 32.

Specifically, depending on the direction of movement, the ring seal 62 rests selectively on one of the two opposite axial boundary surfaces 64, 66 of the annular space 60 and thereby changes a flow cross section of the at least one flow path between the pressure chamber 44 and the vacuum chamber 46.

In the event of a change in direction of the piston 32, the ring seal 62 is automatically moved in the annular space 60 to the first openings 68 or the second openings 70 and changes an effective flow cross section of the openings 68, 70.

The position of the openings 68, 70 is matched to the displaced positions of the ring seal 62 in the annular space 60 in such a way that, when the brake pedal 12 is actuated, the ring seal 62 reduces a flow path from the pressure chamber 44 to the vacuum chamber 46 and, upon return to the initial position, frees a flow path from the vacuum chamber 46 to the pressure chamber 44, in particular to the maximum extent.

For this purpose, the first openings 68 and the second openings 70 are partially covered in the associated position of the ring seal 62.

When the brake pedal 12 is actuated by a driver, the ring seal 62 comes to rest against boundary surface 66, as illustrated in FIG. 5. As a result, the ring seal 62 seals a flow path out of the annular space 60 along the running surface 59 of the piston 32 into the vacuum chamber 46, with the result that in this state no or only a small amount of fluid can flow along the running surface 59 of the piston 32 into the vacuum chamber 46.

This means that a fluid flow from the pressure chamber 44 into the vacuum chamber 46 must take place at least for the most part via the openings 68, 70.

In addition, the second openings 70 are partially covered by the ring seal 62 when the ring seal 62 is in the position illustrated in FIG. 5.

The flow path of the fluid during actuation of the brake pedal 12 is illustrated by a dashed line in FIG. 5.

When the brake pedal 12 is actuated, when the pressure chamber 44 is compressed and the vacuum chamber 46 is expanded, a vacuum is produced in the vacuum chamber 46 and an excess pressure is correspondingly produced in the pressure chamber 44, with the result that fluid is sucked into the vacuum chamber 46 from the pressure chamber 44.

However, since the fluid flow into the vacuum chamber 46 must take place via the relatively small second openings 70, which are additionally covered by the ring seal 62, a pressure equalization between the pressure chamber 44 and the vacuum chamber 46 takes place only relatively slowly when the piston 32 is actuated, with the result that there is strong damping of the piston movement.

When the brake pedal 12 is released, the piston 32 is moved back into its initial position by the return spring 54.

In this case, the pressure chamber 44 is correspondingly expanded and the vacuum chamber 46 compressed, with the result that fluid which was sucked into the vacuum chamber 46 when the brake pedal 12 was actuated is forced out of the vacuum chamber 46 again and flows into the pressure chamber 44.

As a result of the change in the direction of movement of the piston 32, the ring seal 62 detaches from the boundary surface 66 remote from the pressure chamber 44 and comes to rest against the opposite boundary surface 64, as illustrated in FIG. 6.

In this state, the fluid flow along the running surface of the piston 32 is no longer sealed from the annular space 60 into the vacuum chamber 46, but from the annular space 60 into the pressure chamber 44.

Moreover, it is no longer the second openings 70 but the first openings 68 which are partially covered by the ring seal 62.

In an alternative exemplary arrangement, the first openings 68 can be uncovered while the brake pedal 12 is being reset.

The fluid flow when the brake pedal 12 is released consequently runs from the vacuum chamber 46, via the now uncovered second openings 70, into the annular space 60 and, starting from the annular space 60, once again through the first openings 68 into the pressure chamber 44.

The flow path of the fluid when the brake pedal 12 is released is likewise illustrated by a dashed line in FIG. 6.

Since the first openings 68 have a larger flow cross section than the second openings 70 and, in addition, are covered to a lesser extent by the ring seal 62, the fluid flow from the vacuum chamber 46 into the pressure chamber 44 can take place more quickly when the brake pedal 12 is unactuated than when the brake pedal 12 is being actuated, as a result of which less pronounced damping of the piston movement and thus rapid resetting of the brake pedal 12 takes place.

As already mentioned above, the first openings 68 can also remain uncovered. This is achieved, for example, by extending the annular space 60 in the axial direction and locating the first openings 68 at a greater distance from boundary surface 64 than in the exemplary arrangement illustrated.

The invention claimed is:

1. A pneumatic brake pedal module for a brake-by-wire brake system of a vehicle, comprising a pivotably mounted brake pedal and a damping unit, wherein the damping unit comprises a housing and a piston mounted movably in the housing, wherein a piston rod extends from an end of the piston and the piston is coupled via the piston rod to the brake pedal; wherein the damping unit is mechanically coupled to the brake pedal in order to generate a resistance when the brake pedal is actuated, such that the damping unit is subjected to tension when the brake pedal is actuated; wherein the housing further comprises a pressure chamber therein and a vacuum chamber therein, the pressure chamber and vacuum chamber separated by the piston; wherein there is a flow connection between the pressure chamber and the vacuum chamber; wherein the damping unit further comprises a restrictor that restricts an air flow from the pressure chamber into the vacuum chamber; wherein the restrictor is defined by a running surface of the piston facing an inner wall of the housing, an annular space being formed in the running surface, and a seal member axially movable within the annular space, the seal member selectively closing a first opening between the annular space and the pressure chamber, and a second opening between the annular space and the vacuum chamber.

2. The brake pedal module according to claim 1, wherein the brake pedal is formed by a strut, which, at a first end, has an actuating surface that can be actuated by a driver in order to signal a braking intention, and which is coupled to the damping unit in an end section opposite the first end.

3. The brake pedal module according to claim 1, wherein the damping unit comprises a return spring, which pushes the piston into an unactuated initial position.

4. The brake pedal module according to claim 3, wherein the piston has a circular surface on one end and an annular surface on an opposite end, wherein the annular surface delimits the pressure chamber in the housing, which pressure chamber is compressed by the movement of the piston when the brake pedal is actuated, and the circular surface delimits the vacuum chamber in the housing, a volume of which vacuum chamber is enlarged when the brake pedal is actuated.

5. The brake pedal module according to claim 1, wherein the piston has a circular surface on one end and an annular surface on an opposite end, wherein the annular surface delimits the pressure chamber in the housing, which pressure chamber is compressed by the movement of the piston when the brake pedal is actuated, and the circular surface delimits the vacuum chamber in the housing, a volume of which vacuum chamber is enlarged when the brake pedal is actuated.

6. The brake pedal module according to claim 1, wherein the restrictor restricts an air flow from the pressure chamber into the vacuum chamber more strongly when the brake pedal is actuated than when the brake pedal is reset.

7. The brake pedal module according to claim 6, wherein the piston is non-rotatably mounted.

8. The brake pedal module according to claim 6, wherein the damping unit is pneumatically self-contained.

9. The brake pedal module according to claim 6, wherein the brake pedal module comprises a sensor unit for detecting a braking intention of a driver.

10. The brake pedal module according to claim 1, wherein the piston is non-rotatably mounted.

11. The brake pedal module according to claim 1, wherein the damping unit is pneumatically self-contained.

12. The brake pedal module according to claim 1, wherein the brake pedal module comprises a sensor unit for detecting a braking intention of a driver.

13. The brake pedal module of claim 2, wherein the brake pedal is mounted pivotably between the first end and the end section on a mounting which is fixed with respect to the vehicle.

14. The brake pedal module according to claim 13, wherein a piston rod extends from an end of the piston and the piston is coupled via the piston rod to the brake pedal.

15. The brake pedal module according to claim 14, wherein the damping unit comprises a return spring, which pushes the piston into an unactuated initial position.

16. The brake pedal module according to claim 1, wherein there are multiple first openings extending between the annular space and the pressure chamber and multiple second openings extending between the annular space and the vacuum chamber.

17. The brake pedal module according to claim 16, the first openings have, in total, a larger flow cross section than the second openings in total.

18. The brake pedal module according to claim 17, wherein the first openings have a flow cross section which is smaller than or the same as that of the second openings, but there are more first openings than the second openings.

* * * * *